United States Patent
Bennitt et al.

(10) Patent No.: US 6,712,363 B2
(45) Date of Patent: Mar. 30, 2004

(54) COMPRESSION RING SEALING DEVICE WITH END GAP CONTROL AND A METHOD OF MANUFACTURING SAME

(75) Inventors: Robert A. Bennitt, Painted Post, NY (US); Larry A. Schnautz, deceased, late of West Elmira, NY (US), by Donna A Schnautz, executrix

(73) Assignee: Dresser-Rand Company, Olean, NY (US)

( * ) Notice: Subject to any disclaimer, the term of this patent is extended or adjusted under 35 U.S.C. 154(b) by 48 days.

(21) Appl. No.: 10/041,359

(22) Filed: Jan. 8, 2002

(65) Prior Publication Data
US 2003/0127802 A1 Jul. 10, 2003

(51) Int. Cl.[7] .................................................. F16J 9/14
(52) U.S. Cl. ........................ 277/489; 277/491; 277/493; 277/548
(58) Field of Search ................................ 277/493, 489, 277/496.9, 543, 547, 548, 491, FOR 198, FOR 199, FOR 200, FOR 201, FOR 205, FOR 227, FOR 229

(56) References Cited

U.S. PATENT DOCUMENTS

| 929,484 A | | 7/1909 | Petter | |
|---|---|---|---|---|
| 948,518 A | * | 2/1910 | McQuay et al. | 277/446 |
| 1,293,617 A | * | 2/1919 | Obertop | 277/483 |
| 1,369,104 A | * | 2/1921 | Hendrickson | 277/497 |
| 1,369,592 A | | 2/1921 | White | |
| 1,374,852 A | * | 4/1921 | Ingram | 277/446 |
| 1,379,246 A | * | 5/1921 | Butler | 277/446 |
| 1,393,542 A | | 10/1921 | Kistner | |
| 1,426,766 A | * | 8/1922 | Petrie | 277/491 |
| 1,515,246 A | | 11/1924 | Ford | |
| 1,720,128 A | * | 7/1929 | Kerns | 277/491 |
| 1,749,832 A | * | 3/1930 | Morton | 277/446 |
| 2,047,590 A | * | 7/1936 | Madsen | 277/489 |
| 2,055,153 A | * | 9/1936 | Madsen | 277/486 |
| 2,591,920 A | | 4/1952 | Colvin | |
| 2,607,645 A | * | 8/1952 | Westerhouse | 277/446 |
| 2,705,178 A | * | 3/1955 | Bergeron | 277/446 |
| 2,757,057 A | * | 7/1956 | Sanon | 277/446 |
| 2,846,281 A | * | 8/1958 | Szigeti | 277/493 |
| 2,910,332 A | * | 10/1959 | Madsen | 277/446 |
| 4,371,174 A | | 2/1983 | Gurtler | |
| 5,752,705 A | | 5/1998 | Plant | 277/466 |
| 6,045,135 A | * | 4/2000 | Feistel | 277/434 |

FOREIGN PATENT DOCUMENTS

RU    2065107 C1  *  9/1996

* cited by examiner

*Primary Examiner*—Alison K. Pickard
(74) *Attorney, Agent, or Firm*—Haynes and Boone, LLP

(57) ABSTRACT

A sealing method and method according to which a first and second ring are each provided with split ends, and an arcuate lip extends from one end portion of the each ring and in an axial direction relative to the ring and projects outwardly from the face of the ring. The rings are disposed in an interlocking relationship with the second portion of the lip of the first ring extending within, and in a closely spaced relation to, the corresponding inner surface of the second ring; and with the second portion of each lip of the second ring extending within, and in a closely spaced relation to, the corresponding inner surface of the first ring.

11 Claims, 2 Drawing Sheets

COMPRESSION RING SEALING DEVICE WITH END GAP CONTROL AND A METHOD OF MANUFACTURING SAME

BACKGROUND

The present disclosure relates, in general, to a sealing device, and, more particularly, to a compression ring sealing device with end gap control.

A typical compression ring is mounted in an annular groove of a piston that reciprocates in a cylinder bore and functions to seal against the egress of gases from the cylinder. This type of ring usually functions well within a continuous bore but is subject to "clipping" when the bore is interrupted by non-continuous portions of the bore, such as ports, scallops and gas passages. In the latter situation, the unsupported ends of the ring tend to flex into the non-continuous portion of the bore due to both ring tension and gas loading. When the ring is then forced back on the continuous portion of the bore in response to further movement of the piston, damage to the ring will quite often occur.

SUMMARY

In order to overcome the above, a sealing device and method according to an embodiment of the present invention includes a first and second ring, each of which are provided split ends. An arcuate lip extends from one end portion of the each ring and in an axial direction relative to the ring and projects outwardly from the face of the ring. The rings are disposed in an interlocking relationship with the second portion of the lip of the first ring extending within, and in a closely spaced relation to, the corresponding inner surface of the second ring; and with the second portion of each lip of the second ring extending within, and in a closely spaced relation to, the corresponding inner surface of the first ring.

DESCRIPTION OF THE PRIOR ART

Figure 1:
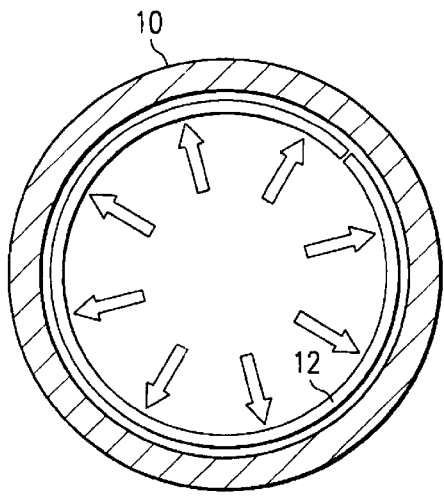
FIGS. 1 and 2 are sectional views taken across a cylinder that receives a compression ring according to the prior art.

Referring to FIG. 1 of the drawings, the reference numeral 10 refers to a cylinder in which a split compression ring 12 according to the prior art is disposed. Although not shown in the drawing in the interest of clarity, it is understood that a piston is mounted for reciprocal movement in the bore of the cylinder 10, and that the compression ring 12 is mounted in an annular groove in the piston and is adapted to engage the inner wall of the cylinder 10 during this movement. A uniform, radially-extending, pressure distribution shown by the arrows is thus applied to the ring 12 and forces it against the inner wall of the cylinder 10 to seal the interface against the egress of gases.

Figure 2:
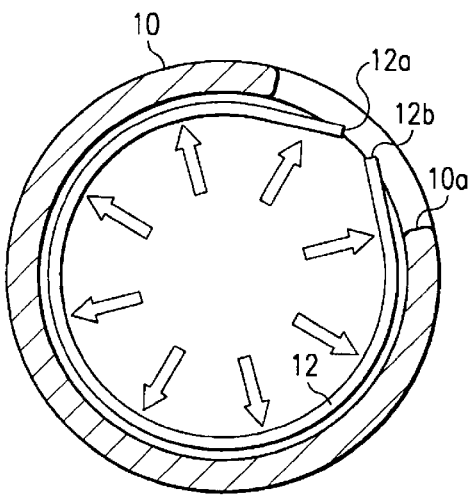

With reference to FIG. 2, when the piston, and therefore the ring 12, pass over a discontinuous portion of the cylinder bore, such as a port 10a formed through the wall of the cylinder 10, the ends 12a and 12b of the ring 12 separate and the corresponding end portions of the ring tend to flex and straighten out, and thus extend into the port, as shown. Thus, further movement of the piston causes the ring 12 to be forced back on the continuous portion of the cylinder wall, often causing damage to the ring.

DESCRIPTION OF A PREFERRED EMBODIMENT

Figure 3:
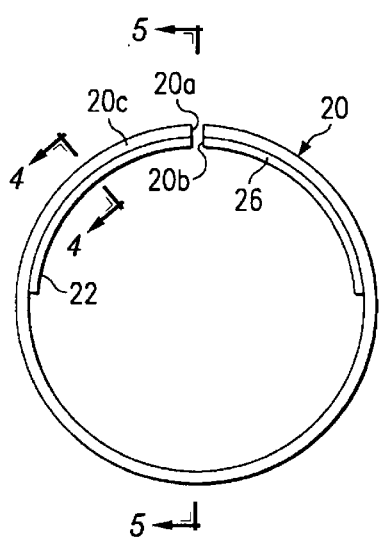
FIG. 3 is a front elevational view of a compression ring according to an embodiment of the present invention.
Figure 4:
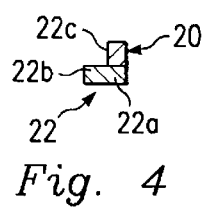
FIGS. 4 and 5 are cross-sectional views taken along the lines 4—4, and 5—5, respectively of FIG. 3.
Figure 5:
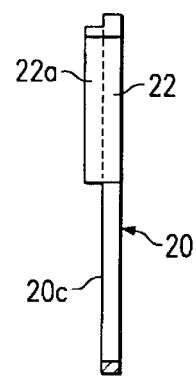

An embodiment of the present invention shown in FIGS. 3–7 and includes a compression ring 20 which is split to form two facing, slightly-spaced ends 20a and 20b. An arcuate lip 22 is molded integrally with the ring 20 and has a first portion 22a extending in the plane of the ring in a radial direction from a portion of the radial inner surface of the ring, and a second portion 22b extending in a plane perpendicular to the first-mentioned plane and in a axial direction relative to the ring. As better shown in FIG. 4, the second lip portion 22b projects in an axial direction from the front face 20c of the ring 20 for a distance approximately equal to the thickness of the ring 20. As shown in FIGS. 3 and 5, the lip 22 extends in an arcuate direction from the end 20a of the ring to an area of the ring approximate 90 degrees from the latter end.

Similarly, an arcuate lip 26 is molded integrally with the ring 20 and extends in a arcuate direction from the end 20b of the ring to an area of the ring approximate 90 degrees from the latter end in a opposite direction from the lip 22. Since the lip 26 is otherwise identical to the lip 22 it will not be described in further detail.

Figure 6:
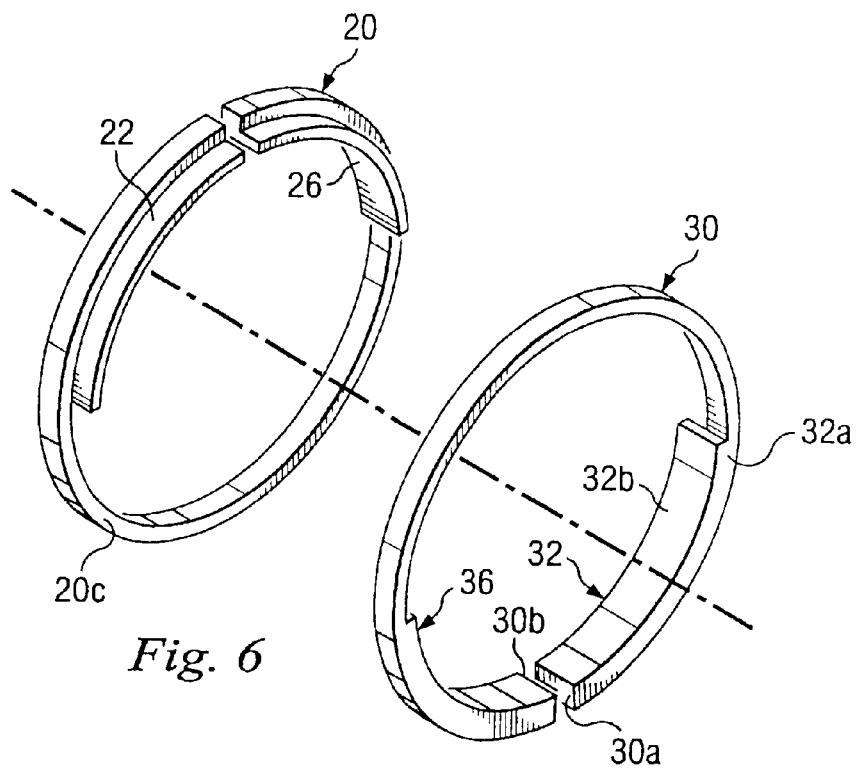
FIG. 6 is an exploded isometric view of the compression ring of FIGS. 3–5 and another identical ring.
Figure 7:
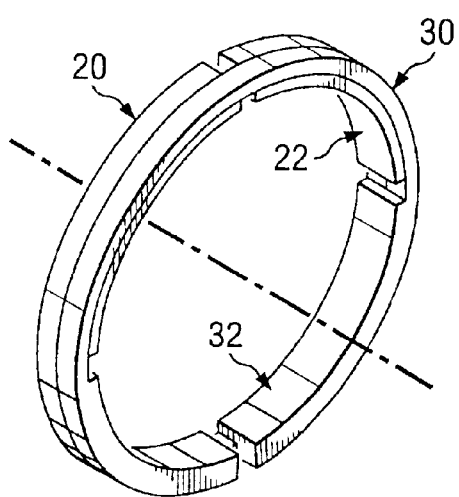
FIG. 7 is view similar to that of FIG. 6 but depicting the rings in an interlocked, nestled position.

FIGS. 6 and 7 depict the ring 20 in a cooperating relationship with a ring 30 which is identical to the ring 20 and, as such, is split to form two facing, slightly-spaced ends 30a and 30b. An arcuate lip 32 is molded integrally with the ring 30 and has a first portion 32a extending in the plane of the ring in a radial direction from a portion of the radial inner surface of the ring, and a second portion 32b extending in a plane perpendicular to the first-mentioned plane and in a axial direction relative to the ring. The second lip portion 32b projects in an axial direction from the front face of the ring 30 for a distance approximately equal to the thickness of the ring 30. The lip 32 extends in an arcuate direction from the end 30a of the ring to an area of the ring approximately 90 degrees from the latter end.

Similarly, an arcuate lip 36 is molded integrally with the ring 30 and extends in a arcuate direction from the end 30b of the ring to an area of the ring approximate 90 degrees from the latter end in an opposite direction from the lip 32. Since the lip 36 is otherwise identical to the lip 32 it will not be described in further detail.

The rings 20 and 30 are shown in an interlocked position in FIG. 7. Prior to the interlocking, the rings 20 and 30 are positioned in a spaced relation shown in FIG. 6 with the lips 32 and 36 of the ring 30 angularly spaced 180 degrees from the lips 22 and 26 of the ring 20. Then, the rings 20 and 30 are move towards each other to the interlocked position shown in FIG. 7. In this interlocked position, the face 20c of the ring 20 engages the corresponding face of the ring 30, and the lip portion 22a and the corresponding portion of the lip 26 of the ring 22 extend inside the corresponding inner surfaces of the ring 30 in a closely-spaced, nested, relationship. Also, the lip portion 32a of the ring 32 and the corresponding portion of the lip 36 extend inside the corresponding inner surfaces of the ring 20 in a closely-spaced, nested, relationship.

This locks the rings 20 and 30 against any radial movement relative to each other, thus eliminating any tendency of the ends 20a, 20b, 20c and 20d to flex and extend into any non-continuous portion of the bore, such as the port 10a shown in FIG. 2 and a bore diametrically opposed to the latter bore. Of course, this eliminates any forcing of the ends 20a, 20b, 20c and 20d back on the continuous portion of the bore during further movement of the piston and minimizes any attendant damage to the ring 20 and 30.

It is understood that several variations may be made in the foregoing without departing from the scope of the invention. For example, each ring 20 and 30 can be used independently, and each ring can have a number of lips more or less than the two specified above. Also, the specific shape and dimensions of the lips 22, 26, 32 and 36 can be varied within the scope of the invention. Further, the first lip portion 22a of the lip 22 can be eliminated and the latter lip 22 be formed with only the lip portion 22b (this also would apply to the other lips 26, 32, and 26). Still further, the rings 20 and 30 are not limited to use with the piston-cylinder arrangement discussed above, but are equally applicable to other arrangements requiring sealing of gases across an interface.

Other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A sealing device comprising:

a first and second ring portion, each having an inner surface and a face;

a first arcuate lip formed integrally with the first ring portion, extending in an axial direction relative to the first ring portion, and projecting outwardly from the face of the first ring portion; and a second arcuate lip formed integrally with the second ring portion, extending in an axial direction relative to the second ring portion, and projecting outwardly from the face of the second ring portion;

each lip extending radially inwardly from an inner surface of its corresponding ring portion;

the face of the first ring portion abutting the face of the second ring portion, with the first lip engaging and supporting a corresponding surface of the second ring portion, and with the second lip engaging and supporting a corresponding surface of the first ring portion, to interlock the ring portions;

the thickness of each lip being constant along its arcuate length so that each lip supports its corresponding ring portion along the entire arcuate length of the lip.

2. The device of claim 1 wherein the first lip engages and supports the corresponding inner surface of the second ring portion and wherein the second lip engages and supports the corresponding inner surface of the first ring portion.

3. The device of claim 1 wherein each ring portion has two splits ends and wherein each lip is split to form ends that extend flush with the corresponding ends of its corresponding ring portion.

4. The device of claim 1 wherein each lip extends axially for a distance substantially corresponding to the axial dimension of its corresponding ring portion.

5. The device of claim 1 wherein each lip extends arcuately relative to its corresponding ring portion for approximately 90 degrees.

6. A sealing device comprising:

a first and second ring portion, each having an inner surface and a face;

a first arcuate lip formed integrally with the first ring portion, extending in an axial direction relative to the first ring portion, and projecting outwardly from the face of the first ring portion; and a second arcuate lip formed integrally with the second ring portion, extending in an axial direction relative to the second ring portion, and projecting outwardly from the face of the second ring portion;

the face of the first ring portion abutting the face of the second ring portion, with the first lip engaging and supporting a corresponding surface of the second ring portion, and with the second lip engaging and supporting a corresponding surface of the first ring portion, to interlock the ring portions;

the thickness of each lip being approximately equal to the thickness of its corresponding ring portion and being constant along its arcuate length, so that each lip supports its corresponding ring portion along the entire arcuate length of the lip.

7. A sealing device comprising:

a first and second ring portion, each having an inner surface, a face and two split ends;

a first arcuate lip formed integrally with the first ring portion, extending in an axial direction relative to the first ring portion, and projecting outwardly from the face of the first ring portion; and a second arcuate lip formed integrally with the second ring portion, extending in an axial direction relative to the second ring portion, and projecting outwardly from a face of the second ring portion;

each lip extending radially inwardly from an inner surface of its corresponding ring portion;

the face of the first ring portion abutting the face of the second ring portion, with the first lip engaging and supporting the corresponding inner surface of the second ring portion, and with the second lip engaging and supporting the corresponding inner surface of the first ring portion, to interlock the ring portions;

each lip being split to form ends that extend flush with the corresponding ends of its corresponding ring portion.

8. The device of claim 7 wherein each lip extends axially for a distance substantially corresponding to the axial dimension of its corresponding ring portion.

9. The device of claim 7 wherein each lip extends arcuately relative to its corresponding ring portion for approximately 90 degrees.

10. The device of claim 7 wherein the thickness of each lip is constant along its arcuate length so that each lip supports its corresponding ring portion along the entire arcuate length of the lip.

11. A sealing device comprising:

a first and second ring portion, each having an inner surface, a face and two split ends;

a first arcuate lip formed integrally with the first ring portion, extending in an axial direction relative to the first ring portion, and projecting outwardly from the face of the first ring portion; and a second arcuate lip formed integrally with the second ring portion, extending in an axial direction relative to the second ring portion, and projecting outwardly from the face of the second ring portion;

the thickness of each lip being approximately equal to the thickness of its corresponding ring portion and being constant along its arcuate length so that each lip supports its corresponding ring portion along the entire arcuate length of the lip;

the face of the first ring portion abutting the face of the second ring portion, with the first lip engaging and supporting the corresponding inner surface of the second ring portion, and with the second lip engaging and supporting the corresponding inner surface of the first ring portion, to interlock the ring portions;

each lip being split to form ends that extend flush with the corresponding ends of its corresponding ring portion.

* * * * *